Patented Aug. 7, 1951

2,563,037

UNITED STATES PATENT OFFICE 2,563,037

CONVERSION OF AROMATIC AMINES TO AROMATIC HYDROCARBONS

Vladimir N. Ipatieff, Chicago, and George S. Monroe, Berwyn, Ill., assignors to Universal Oil Products Company, Chicago, Ill., a corporation of Delaware No Drawing. Application January 29, 1948, Serial No. 5,187

10 Claims. (Cl. 260—668)

This invention relates to a process for converting amines in the presence of water and a hydrogenation catalyst.

An object of this invention is to react an amine with water in the presence of a hydrogenation catalyst at an elevated temperature.

Another object of this invention is to convert a dialkyl amine into a monoalkylamine and a trialkylamine.

A further object of this invention is to produce an aromatic hydrocarbon by reacting an aromatic amine and steam in the presence of a hydrogenation catalyst.

One specific embodiment of this invention relates to an amine conversion process which comprises reacting an amine and steam in the presence of a hydrogenation catalyst.

Another embodiment of this invention relates to a process which comprises reacting a dialkyl amine and steam in the presence of a hydrogenation catalyst at a temperature of from about 100° to about 400° C.

We have found that amines may be converted by treatment with water at an elevated temperature in the presence of a hydrogenation catalyst. Thus monoarylamines as aniline, toluidine, ethyl aniline, etc., are convertible into the aromatic hydrocarbons benzene, toluene, and ethylbenzene, respectively, as well as certain amounts of the corresponding naphthenic hydrocarbons. This process is also applicable to the conversion of a dialkylamine into a mixture of monoalkylamine and trialkylamine.

Hydrogenation catalysts useful in the process contain at least one metal of group VIII of the periodic table and particularly nickel, cobalt, palladium, and platinum. These metal hydrogenation catalysts may also be supported by suitable carriers such as alumina, silica, diatomaceous earth, acid treated clay, crushed porcelain, charcoal, pumice, etc.

The process is carried out either in batch or continuous types of treatment by contacting one molecular proportion of the amine and from 1 to 10 molecular proportions of water (or steam) at a temperature of from about 100° to about 400° C. and at a pressure of from substantially atmospheric to about 100 atmospheres in the presence of an active hydrogenation catalyst for a time sufficient to effect conversion. It is preferred to carry out the process in a continuous manner by passing the reaction mixture through a reactor containing a granular hydrogenation catalyst and maintained at the aforesaid conditions of temperature and pressure. The charging rate of the reaction mixture generally corresponds to a combined liquid hourly space velocity of from about 0.2 to about 4. The process may also be carried out in the presence of methane charged at a gaseous hourly space velocity of up to about 100. Reaction products obtained in either batch or continuous operations are then subjected to suitable separation treatment to recover the desired product and unconverted starting material, the latter then being recycled to further treatment by the process.

The process of this invention is illustrated further by the following examples.

EXAMPLE I

Aniline and water were pumped from separate chargers and introduced to a steel catalyst tube containing a nickel-diatomaceous earth catalyst (about 60% metallic nickel content) maintained at the temperatures shown in Table I.

TABLE I

Conversion of aniline over nickel-silica catalyst at atmospheric pressure in the presence of steam and of a mixture of steam and methane

| Run No. | 1 | 2 | 3 |
|---|---|---|---|
| Experimental Conditions: | | | |
| Temperature, °C.— | | | |
| Furnace Block | 371 | 347 | 345 |
| Catalyst (avg.) | 365 | 334 | 333 |
| HLSV—Water | 0.43 | 0.49 | 0.49 |
| Aniline | 0.61 | 0.69 | 0.73 |
| HGSV—Methane Charge Stock | 65 | | 77 |
| Mole Ratio: | | | |
| $H_2O$ : Aniline : $CH_4$ | 8.3:2.3:1.0 | | 7.8:2.3:1.0 |
| $H_2O$ : Aniline | | 3.5:1.0 | |
| Weight Balance, g.: | | | |
| In—Water | 43.9 | 62.4 | 78.9 |
| Aniline | 63.8 | 91.8 | 120.1 |
| Methane [1] | 4.4 | | 8.5 |
| Nitrogen [1] | 0.4 | | 0.8 |
| Total | 112.5 | 154.2 | 208.3 |
| Out—Carbon Dioxide | 11.4 | 3.3 | 4.6 |
| Carbon Monoxide | 0.2 | 0.4 | 0.7 |
| Hydrogen | 1.2 | 0.6 | 0.8 |
| Methane | 10.5 | 0.5 | 8.3 |
| Nitrogen | 0.7 | 0.0 | 0.5 |
| Benzene | 36.1 | 51.5 | 57.9 |
| Aniline | 0.0 | 14.2 | 39.2 |
| Cyclohexane | 3.6 | 0.0 | 0.0 |
| Water+$(NH_4)_2CO_3$ | 43.0 | 69.0 | 87.9 |
| Loss | 5.8 | 14.7 | 8.4 |
| Total | 112.5 | 154.2 | 208.3 |
| Conversions and Recoveries, Percent: | | | |
| Aniline Converted to Benzene | 67.2 | 67.0 | 57.5 |
| Aniline Converted to Cyclohexane | 6.3 | 0.0 | 0.0 |
| Aniline Recovered | 0.0 | 15.6 | 32.7 |
| Yields as Wt. Percent Aniline Charge: Methane | 9.6 | 0.5 | 0.0 |

[1] Methane charge stock consisted of 95 mole percent $CH_4$+5 mole percent $N_2$.

As indicated in Table I, the conversion of aniline in the presence of steam and methane at 365° C. gave a 67% yield of benzene and a 6% yield of cyclohexane. All of the aniline underwent conversion in this run. At the lower temperature of 333° C. average catalyst temperature, only 67% of the aniline was converted to give a 58% yield of benzene substantially free from cyclohexane.

In the presence of steam alone at 334° C. catalyst temperature, the conversion of aniline to benzene was 67% without formation of cyclohexane. 16% of the aniline charged was also recovered from the reaction products.

EXAMPLE II 0.5 mole of n-dibutylamine and 1.5 moles of water were passed over 65 cc. (97 grams) of the nickel-diatomaceous earth catalyst (referred to in Example I) at an average temperature of 203° C. for a time of one hour. The reaction product consisted of 66 cc. of upper layer and 28 cc. of lower layer, and 11 cc. of condensible gas. An analysis of the condensible gas showed it to consist of 63.8 mole per cent of propane, 23.2 propylene, 3% of $C_4$ hydrocarbons, 5.7% of $C_5$ hydrocarbons and 4.3% of $C_6+$ hydrocarbons. Also 0.77 mole per cent of non-condensible gas was collected which contained 4.2 mole per cent olefins, 14.0% carbon monoxide, 70.8% hydrogen, 8.6% paraffins, and 2.4% nitrogen. Of the n-dibutylamine charged to the process, 3% was converted into n-monobutylamine and 9% into n-tributylamine.

We claim as our invention:

1. A process for the conversion of monoarylamines into aromatic hydrocarbons which comprises reacting the monoarylamine with $H_2O$ at a temperature of from about 100° C. to about 400° C. and in the presence of a metal of group VIII of the periodic table.

2. A process for the conversion of monoarylamines into aromatic hydrocarbons which comprises reacting the monoarylamine with $H_2O$ at a temperature of from about 100° C. to about 400° C. and in the presence of a nickel catalyst.

3. A process for the conversion of monoarylamines into aromatic hydrocarbons which comprises reacting the monoarylamine with $H_2O$ at a temperature of from about 100° C. to about 400° C. and in the presence of a composite of nickel and diatomaceous earth.

4. A process for the conversion of aniline into benzene which comprises reacting the aniline with $H_2O$ at a temperature of from about 100° C. to about 400° C. and in the presence of a metal of group VIII of the periodic table.

5. A process for the conversion of aniline into benzene which comprises reacting the aniline with $H_2O$ at a temperature of from about 100° C. to about 400° C. and in the presence of a nickel catalyst.

6. A process for the conversion of aniline into benzene which comprises reacting the aniline with $H_2O$ at a temperature of from about 100° C. to about 400° C. and in the presence of a composite of nickel and diatomaceous earth.

7. A process for the conversion of monoarylamines into aromatic hydrocarbons which comprises reacting one molecular proportion of a monoarylamine with from about 1 to about 10 molecular proportions of $H_2O$ at a temperature of from about 100° C. to about 400° C. at a pressure of from substantially atmospheric to about 100 atmospheres and in the presence of a metal of group VIII of the periodic table.

8. A process for the conversion of aniline into benzene which comprises reacting one molecular proportion of aniline with from about 1 to about 10 molecular proportions of $H_2O$ at a temperature of from about 100° C. to about 400° C. at a pressure of from substantially atmospheric to about 100 atmospheres and in the presence of a metal of group VIII of the periodic table.

9. A process for the conversion of aniline into benzene which comprises reacting one molecular proportion of aniline with from about 1 to about 10 molecular proportions of $H_2O$ at a temperature of from about 100° C. to about 400° C. at a pressure of from substantially atmospheric to about 100 atmospheres and in the presence of a nickel catalyst.

10. A process for the conversion of aniline into benzene which comprises reacting one molecular proportion of aniline with from about 1 to about 10 molecular proportions of $H_2O$ at a temperature of from about 100° C. to about 400° C. at a pressure of from substantially atmospheric to about 100 atmospheres and in the presence of a composite of nickel and diatomaceous earth.

VLADIMIR N. IPATIEFF.
GEORGE S. MONROE.

REFERENCES CITED

The following references are of record in the file of this patent:

UNITED STATES PATENTS

| Number | Name | Date |
|---|---|---|
| 2,182,242 | Wooster | Dec. 5, 1939 |
| 2,273,030 | Fitzky et al. | Feb. 17, 1942 |
| 2,289,001 | Fitzky | July 7, 1942 |
| 2,341,782 | Ipatieff et al. | Feb. 15, 1942 |
| 2,438,694 | Cross | Mar. 30, 1948 |

FOREIGN PATENTS

| Number | Country | Date |
|---|---|---|
| 435,404 | Great Britain | Sept. 19, 1935 |
| 743,570 | France | Apr. 3, 1933 |

OTHER REFERENCES

Annales de Chimie et de Physique (8) 4; 376–377.